Feb. 22, 1944. F. A. AGIUS 2,342,107
DECOY
Filed May 14, 1942 2 Sheets-Sheet 1

Inventor
Frank A. Agius
By Clarence A. O'Brien
and Harvey B. Jacobson Attorneys

Feb. 22, 1944.　　　F. A. AGIUS　　　2,342,107
DECOY
Filed May 14, 1942　　　2 Sheets-Sheet 2
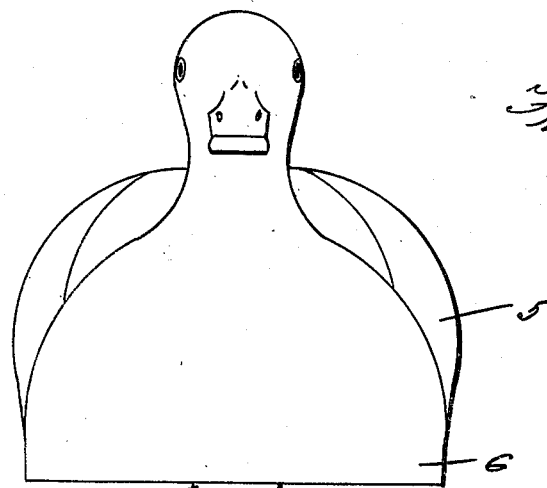
Fig. 2.
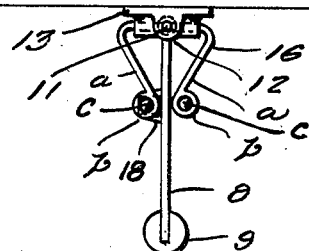
Fig. 3.
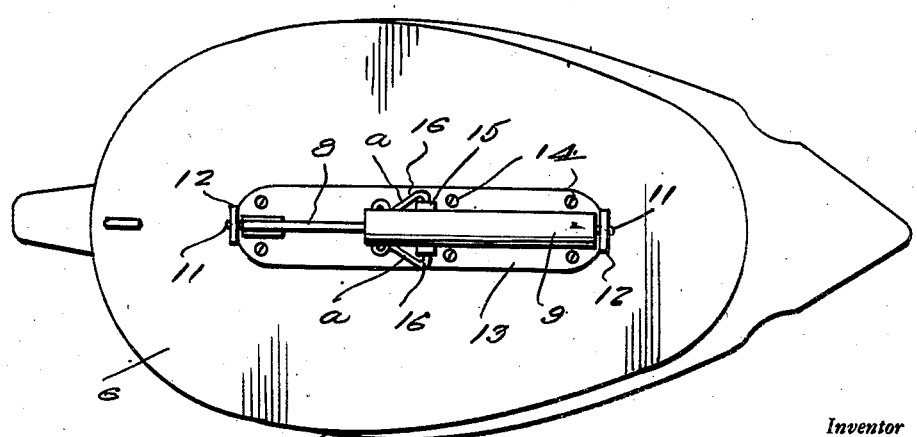
Inventor
Frank A. Agius
By Clarence A. O'Brien
and Harvey B. Jacobson, Attorneys Patented Feb. 22, 1944

2,342,107

UNITED STATES PATENT OFFICE 2,342,107

DECOY

Frank A. Agius, Detroit, Mich.

Application May 14, 1942, Serial No. 442,978

4 Claims. (Cl. 43—3)

This invention relates to new and useful improvements in decoys and more particularly to a decoy for attracting wild game to water surface.

The principal object of the present invention is to provide a water decoy such as is used for ducks, geese and other water fowl, which is provided with means whereby the decoy is righted in the event it becomes upset.

Another important object of the invention is to provide an attachment for decoys which will automatically right a decoy in the event it becomes capsized and even inverted.

Other objects and advantages of the invention will become apparent to the reader of the following description.

In the drawings—

Figure 2 is a front elevational view.

Figure 3 is a bottom plan view.

Figure 1:
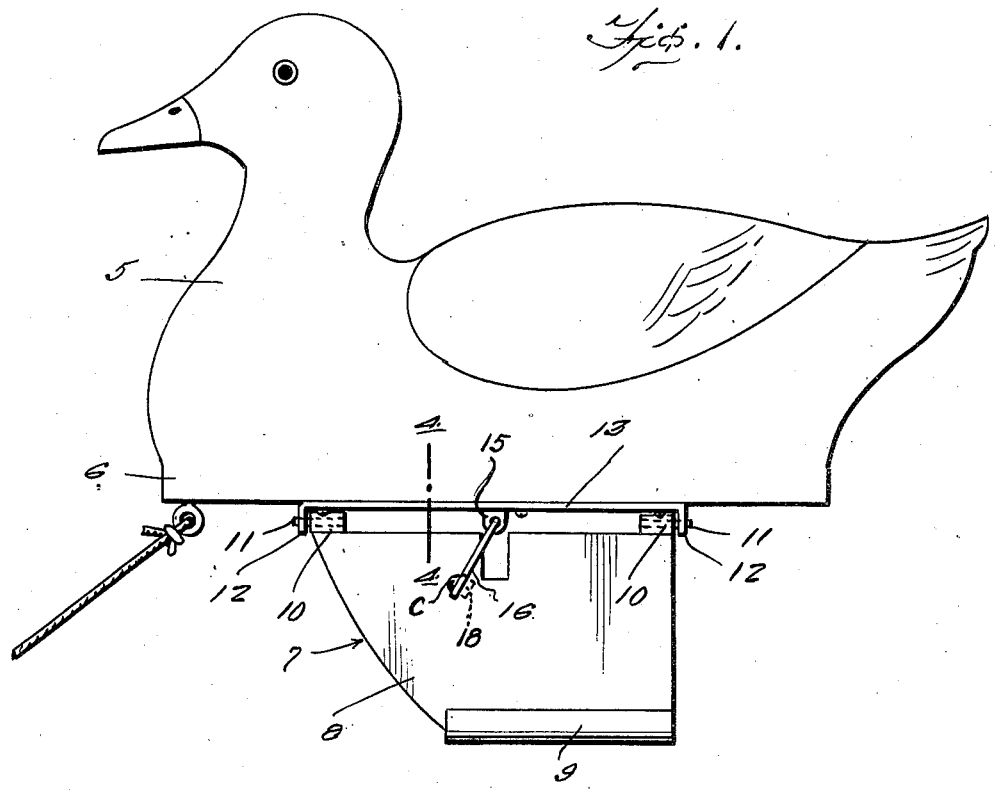
Figure 1 represents a side elevational view of the decoy.
Figure 4:
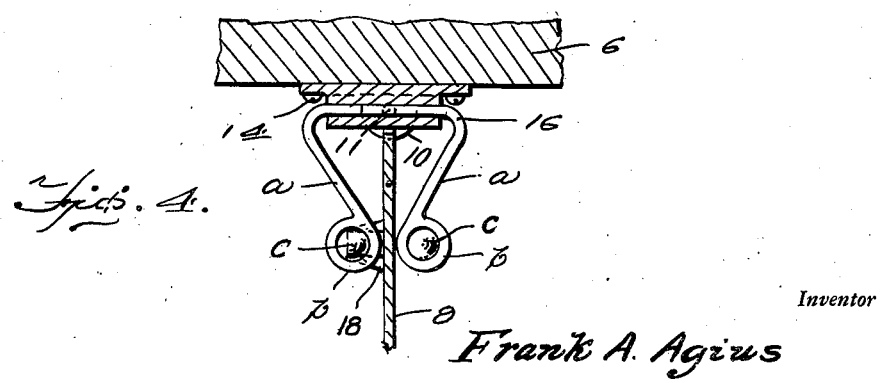
Figure 4 is a sectional view taken substantially on the line 4—4 of Figure 1.

Referring to the drawings wherein like numerals designate like parts, it can be seen that numeral 5 denotes a decoy having a bottom 6.

Numeral 7 generally refers to the improved keel and automatic resetting means.

In carrying out the present invention, it can be seen that numeral 8 denotes a keel plate, preferably curved at its forward edge portion backwardly to a short lower edge, along which edge is secured a weight 9.

The upper corner portions of the keel plate 8 are provided with barrels 10 from which pins 11 extend journaled into apertured lugs 12 on a plate 13 which is secured by screws or the like 14 to the bottom 6.

The plate 13 is formed with an ear 15 for receiving the bight portion of a substantially U-shaped detent 16, the leg portions a, a of which converge and terminate preferably in eyes or enlargements b, b having weighted fillers c—c.

As shown in Figure 1, this detent 16 is prevented from fully gravitating, when the decoy is floating in upright position, because the detent 16 is resting on or supported by a lug 18 projecting laterally from the keel plate 8.

It will be here observed that the head portions b, b of the detent 16 prevent side lashing of the keel plate 8, the keel plate 8 being substantially deep to prevent any wabbling action of the decoy.

However, in the event the duck becomes inverted, looking at Figure 1 up-side-down, it will be seen that the detent 16 will gravitate against the plate 13 and toward the body liberating the keel plate 8, and permitting the keel plate 8 to fall toward one side or the other, thus overbalancing the inverted decoy and causing it to right itself. Promptly upon righting itself, the detent 16 will slip down to the position shown in Figure 1 to hold the keel plate 8 steady.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A decoy comprising a decoy body having a base portion, a keel plate swingably attached to the base portion and having a weighted lower portion, and a detent swingably secured to the base portion for holding the keel plate steadily in a vertical position and to be released from the keel plate when the decoy becomes inverted from capsizing in water, said detent straddling the keel plate when the latter is in vertical position.

2. A decoy comprising a decoy body having a base portion, a keel plate swingably attached to the base portion and having a weighted lower portion, and a detent swingably secured to the base portion for holding the keel plate steadily in a vertical position and to be released from the keel plate when the decoy becomes inverted from capsizing in water, said detent being in the form of a U-shaped swingable member having its leg portions adapted to engage opposite sides of the keel.

3. A decoy comprising a decoy body having a base portion, a keel plate swingably attached to the base portion and having a weighted lower portion, and a detent swingably secured to the base portion for holding the keel plate steadily in a vertical position and to be released from the keel plate when the decoy becomes inverted from capsizing in water, said keel being provided with means for swingably connecting the same to the decoy base portion, said detent straddling the keel plate when the latter is in vertical position.

4. A decoy comprising a decoy body having a base portion, a keel plate swingably attached to the base portion and having a weighted lower portion, and a detent swingably secured to the base portion for holding the keel plate steadily in a vertical position and to be released from the keel plate when the decoy becomes inverted from capsizing in water, and stop means for the detent for preventing the detent from gravitating to a dead-centered position.

FRANK A. AGIUS.